United States Patent
Yoon et al.

(10) Patent No.: US 9,091,798 B2
(45) Date of Patent: Jul. 28, 2015

(54) DISPLAY APPARATUS AND BACKLIGHT ASSEMBLY

(75) Inventors: Juyoung Yoon, Seoul (KR); Hee-Kwang Song, Suwon-si (KR); HanMoe Cha, Anyang-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 590 days.

(21) Appl. No.: 13/423,075

(22) Filed: Mar. 16, 2012

(65) Prior Publication Data

US 2013/0003407 A1 Jan. 3, 2013

(30) Foreign Application Priority Data

Jun. 29, 2011 (KR) .......................... 10-2011-0063950

(51) Int. Cl.
*F21V 8/00* (2006.01)

(52) U.S. Cl.
CPC .............. *G02B 6/0068* (2013.01); *G02B 6/002* (2013.01); *G02B 6/003* (2013.01); *G02B 6/0021* (2013.01); *G02B 6/0073* (2013.01); *G02B 6/0091* (2013.01)

(58) Field of Classification Search
CPC ... G02B 6/0021; G02B 6/0068; G02B 6/0073
USPC ........ 362/615, 611, 612, 613, 621, 628, 97.1, 362/97.3
See application file for complete search history.

(56) References Cited

U.S. PATENT DOCUMENTS

| 7,905,649 B2 * | 3/2011 | Yang et al. ..................... 362/612 |
| 2003/0076669 A1 * | 4/2003 | Itoh et al. ......................... 362/31 |

FOREIGN PATENT DOCUMENTS

| JP | 2006-064899 | 3/2006 |
| JP | 2007-335280 | 12/2007 |
| KR | 1020060124372 | 12/2006 |

\* cited by examiner

*Primary Examiner* — Stephen F Husar
*Assistant Examiner* — Danielle Allen
(74) *Attorney, Agent, or Firm* — Innovation Counsel LLP

(57) ABSTRACT

A display apparatus includes a light source part, a light guide plate, and a display panel. The light source part includes first light sources and second light sources alternately arranged to emit a light having a color different from a color of a light emitted from the second light sources. The light guide plate includes an incident surface having at least one light incident surface facing the light source to guide the light. The display panel receives the light from the light guide plate to display an image. A distance between end portions of the incident surface and the first and second light sources disposed and corresponding to each end portion of the light incident surface is different from a distance between a center portion of the light incident surface and the first and second light sources disposed and corresponding to the center portion.

17 Claims, 9 Drawing Sheets

DISPLAY APPARATUS AND BACKLIGHT ASSEMBLY

CROSS-REFERENCE TO RELATED APPLICATION

This application relies for priority upon Korean Patent Application No. 10-2011-0063950 filed on Jun. 29, 2011, the contents of which are herein incorporated by reference in its entirety.

BACKGROUND

1. Field of Disclosure

The present invention relates to a display apparatus.

2. Description of the Related Art

In general, a display apparatus employing a liquid crystal display panel or an electrophoretic display panel requires a backlight unit.

The backlight unit typically includes a light emitting source and a light guide plate to guide the light emitted from the light source to a display panel. A plurality of light emitting diodes (LEDs) having different colors from each other may be used as the light source. The different color lights emitting from the LEDs are mixed with each other to produce a white light.

Since the LEDs have a uniform orientation angle the light emitted area from each LED is irradiated is rather limited. Accordingly, discontinuous color pattern occurs on a display area of the display panel causing a color defect.

SUMMARY

Exemplary embodiments of the present invention provide a display apparatus capable of preventing occurrence of a color defect on a display panel.

According to the exemplary embodiments, a display apparatus includes a light source part emitting a light, a light guide plate guiding the light from the light source part, and a display panel receiving the light from the light source part to display the display panel. The light source part includes a plurality of first light sources and a plurality of second light sources. The first light sources are alternately arranged with the second light sources to emit a light having a color different from a color of a light emitted from the second light sources. The light guide plate includes an incident surface having at least one light incident surface facing the light source to guide the light. A distance between end portions of the incident surface and the first and second light sources disposed to correspond to one of the end portions is different from a distance between a center portion of the incident surface and the first and second light sources disposed to correspond to the center portion.

A distance between the end portions and the first light sources disposed to correspond to a respective end portion is larger than a distance between the center portion and the first light sources disposed to correspond to the center portion, and a distance between the end portions and the second light sources disposed to correspond to one of the end portions is larger than a distance between the center portion and the second light sources disposed to correspond to the center portion.

The light guide plate has a rectangular plate shape and the light incident surface is provided in a single number.

In addition, a distance between the first light source of the first light sources, which corresponds to one end portion of the end portions, and the incident surface is larger than a distance between the first light source of the first light sources, which corresponds to the other end portion of the end portions, and the incident surface. A distance between the second light source of the second light sources, which corresponds to one end portion of the end portions, and the incident surface is smaller than a distance between the second light source of the second light sources, which corresponds to the other end portion of the end portions, and the incident surface.

According to the above, the display apparatus may prevent occurrence of a color defect on the display panel thereof, thereby improving a display quality of the display apparatus.

DETAILED DESCRIPTION

Figure 1:
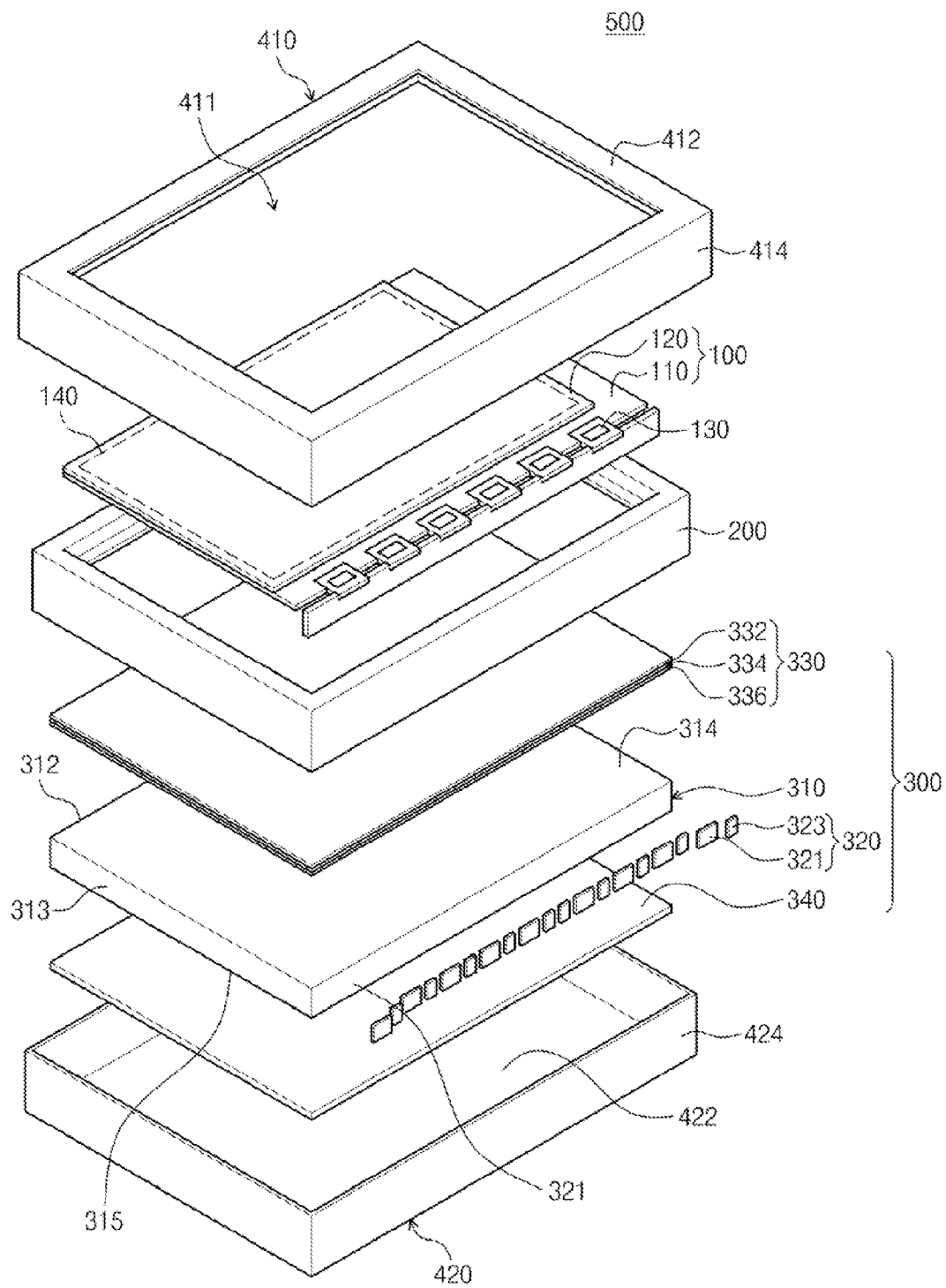
FIG. 1 is an exploded perspective view showing a display apparatus according to a first exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view showing a display apparatus according to a first exemplary embodiment of the present invention.

Referring to FIG. 1, a display apparatus 500 includes a display panel 100, a mold frame 200, a backlight unit 300, an upper cover 410, and a lower cover 420.

The display panel 100 may be any type of display panel, such as a liquid crystal display panel, an electrophoretic display panel, etc. In the present exemplary embodiment, the liquid crystal display panel will be described as a representative example of the display panel 100.

The display panel 100 has a rectangular plate shape having a long side and a short side and displays an image on a display area 140 thereof. In addition, the display panel 100 includes an array substrate 110, an opposite substrate 120 facing the array substrate 110, and a liquid crystal layer (not shown) disposed between the array substrate 110 and the opposite substrate 120.

According to the present exemplary embodiment, the array substrate 110 may include a plurality of pixels (not shown) arranged in a matrix form. Each pixel includes a gate line (not shown) extended in a first direction substantially parallel to a side of the array substrate 110, a data line (not shown) extended in a second direction substantially perpendicular to the first direction to be insulated from the gate line while crossing the gate line, and a pixel electrode (not shown). In addition, each pixel includes a thin film transistor (not shown) electrically connected to the gate line, the data line, and the pixel electrode. The thin film transistor switches a driving signal applied to a corresponding pixel electrode. In addition, a driver integrated circuit (hereinafter, referred to as driver IC) 130 may be disposed adjacent to a side of the array substrate 110. The driver IC 130 receives various signals from external devices and outputs the driving signal to the thin film transistor to drive the display panel 100 in response to the signals.

The opposite substrate 120 may include R, G, and B color filters (not shown) used to display colors using the light provided from the backlight unit 300 and a common electrode (not shown) disposed on the R, G, and B color filters to face the pixel electrode. The R, G, and B color filters may be formed by a thin film process. Meanwhile, the color filters are disposed on the opposite substrate 120 in the present exemplary embodiment, but they should not be limited thereto or thereby. For instance, the color filters may be disposed on the array substrate 110.

The liquid crystal layer includes liquid crystal molecules arranged in a specific direction in response to voltages respectively applied to the pixel electrode and the common electrode, resulting in a light transmittance of the liquid crystal layer with respect to the light from the backlight unit 300. As such, the display panel 100 may display desired images.

The mold frame 200 is provided along an end of the display panel 100 and disposed under the display panel 100 to support the display panel 100. The mold frame 200 has a rectangular ring shape. As shown in FIG. 1, the mold frame 200 may be formed in a single body or multiple parts coupled with each other. In addition, the mold frame 200 may be omitted.

The backlight unit 300 is disposed under the display panel 100. The backlight unit 300 includes a light guide plate 310, a light source part 320 including a plurality of light source 321 and 323, an optical member 330, and a reflection sheet 340.

The light guide plate 310 is disposed under the display panel 100 to guide the light emitted from the light source part 320 to the display panel 100. The light guide plate 310 is overlapped with at least the display area 140 of the display panel 100.

In the present exemplary embodiment, the light guide plate 310 includes an incident surface 311 facing the light source part 320, an opposite surface 312 opposite to the incident surface 311 to reflect the light, side surfaces 313 respectively disposed at both sides of the incident surface 311 to connect the incident surface 311 and the opposite surface 312, an exit surface 314 connected to the incident surface 311, the opposite surface 312, and the side surfaces 313 to output the light, and a lower surface 315 facing the exit surface 314.

The light source part 320 is disposed adjacent to at least one side, e.g., the incident surface 311 of the light guide plate 310. The light source part 320 provides light to the display panel 100 through the light guide plate 310 such that the display panel 100 displays the image using the light. In addition, the light source part 320 includes a plurality of first light sources 321 and a plurality of second light sources 323. The first light sources 321 are alternately arranged with the second light sources 323 and emit light having a different color from that of the light emitted from the second light sources 323. For instance, the first light sources 321 emit light having a magenta color and the second light sources 323 emit light having a green color.

Figure 2:
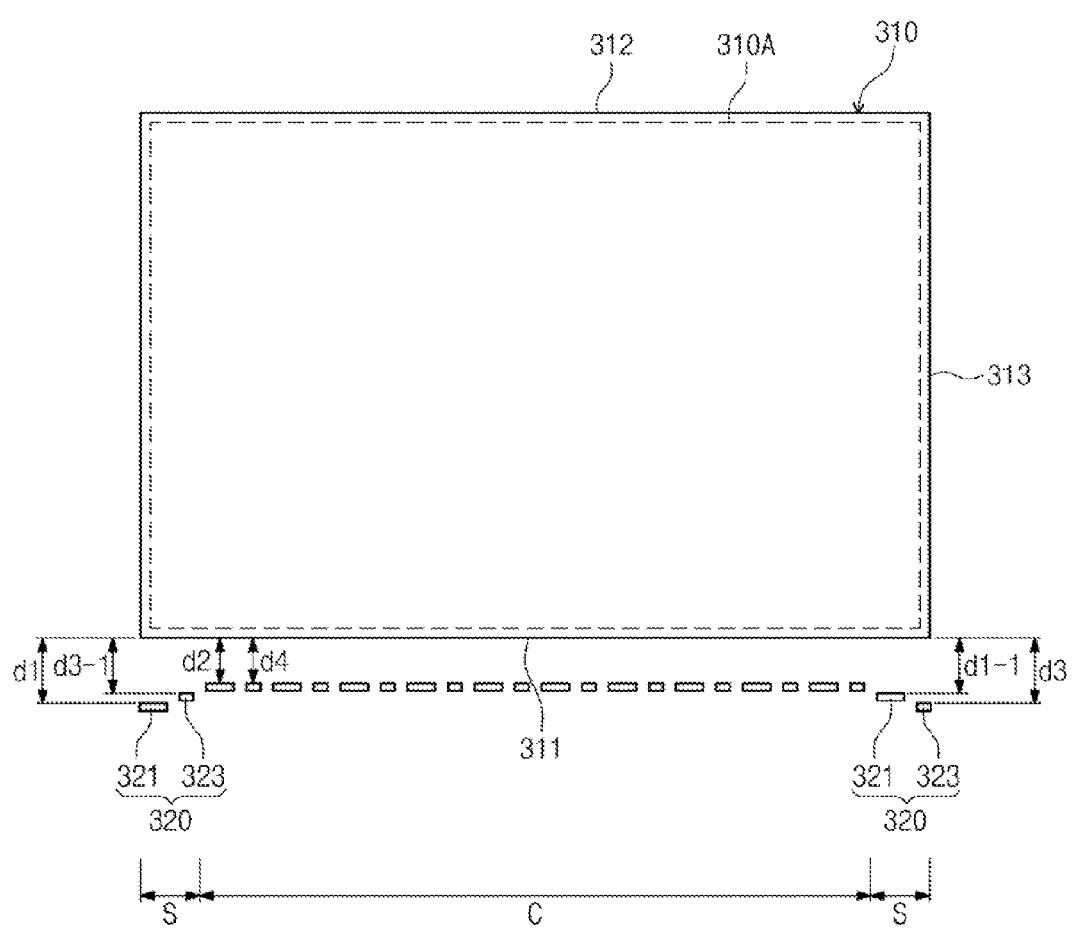
FIG. 2 is a plan view showing a light guide plate and a light source part according to a first exemplary embodiment of the present invention.

In addition, as shown in FIG. 2, a distance between an end portion S of the incident surface 311 and the first and second light sources 321 and 323 facing the end portion S is different from a distance between a center portion C of the incident surface 311 and the first and second light sources 321 and 323 facing the center portion C of the incident surface 311.

The optical member 330 is disposed between the light guide plate 310 and the display panel 100. The optical member 330 controls the light exiting from the light guide plate 310. In addition, the optical member 330 includes a diffusion sheet 336, a prism sheet 334, and a protection sheet 332, which are sequentially stacked.

The diffusion sheet 336 diffuses the light exiting from the light guide plate 310. The prism sheet 334 condenses the light diffused by the diffusion sheet 336 in a direction vertical to the display panel 100 disposed thereabove. The light passing through the prism sheet 334 is substantially vertically incident to the display panel 100. The protection sheet 332 is disposed on the prism sheet 334 to protect the prism sheet 334 from external impacts.

In the present exemplary embodiment, the optical member 330 includes one diffusion sheet 336, one prism sheet 334, and one protection sheet 332, but it should not be limited thereto or thereby. That is, the optical member 330 may include at least one of the diffusion sheet 336, the prism sheet 334, and the protection sheet 332 in a plural number, or one of the diffusion sheet 336, the prism sheet 334, and the protection sheet 332 may be removed from the optical member 330.

The reflection sheet 340 is disposed under the light guide plate 310 to reflect the light leaked from the light guide plate 310 without being directed to the display panel 100. Thus, an optical path of the light reflected by the reflection sheet 340 is changed and the light reflected by the reflection sheet 340 travels to the display panel 100. To this end, the reflection sheet 340 includes a material that reflects the light. In addition, a portion of the reflection sheet 340 is disposed between the lower cover 420 and the light source part 320 to reflect the light emitted from the light source part 320. As a result, the reflection sheet 340 may enhance the amount of the light provided to the display panel 100.

The upper cover 410 is disposed on the display panel 100 and has a shape suitable for the display panel 100. In detail, the upper cover 410 includes a display window 411 formed therethrough to expose the display area 140 of the display panel 100. The upper cover 410 includes an upper surface 412 to support a front end of the display panel 100 and an upper cover side surface 414 extended downward from the upper surface 412 to the lower cover 420. As shown in FIG. 1, since the display panel 100 has a rectangular plate shape, the upper cover side surface 414 may be provided in four side surfaces. The upper cover 410 is coupled with the lower cover 420 to support the front end of the display panel 100.

The lower cover 420 is disposed under the backlight unit 300. The lower cover 420 includes a bottom surface 422 corresponding to the backlight unit 300 and a lower cover side surface 424 extended upward from the bottom surface 422. The lower cover side surface 424 may be provided in four side surfaces since the display panel and the backlight unit have substantially the same the rectangular plate shape. The lower cover 420 provides a receiving space defined by the bottom surface 422 and the lower cover side surface 424 to accommodate the display panel 100 and the backlight unit 300. In addition, the lower cover 420 is coupled with the upper cover 410 to accommodate and support the display panel 100 and the backlight unit 300 therein.

FIG. 2 is a plan view showing a light guide plate and a light source part according to a first exemplary embodiment of the present invention.

Referring to FIG. 2, the light guide plate 310 may have the rectangular plate shape, and thus the incident surface 311 serves as one light incident surface.

The light source part 320 is disposed corresponding to the incident surface 311 of the light guide plate 310. The light guide plate 320 includes the first light sources 321 and the second light sources 323 alternately arranged with the first light sources 321 and emitting a light having the different color from a light emitted from the first light sources 321.

The distances d1 and d1-1 between the both end portions S of the incident surface 311 and the first light sources 321 corresponding to the both end portions S is larger than a distance d2 between the center portion C of the incident surface 311 and the first light sources 321 corresponding to the center portion C of the incident surface 311. In addition, the distance d1 between a first light source of the first light sources 321, which corresponds to one end portion of the both end portions S, and the incident surface 311 may be larger than the distance d1-1 between a first light source of the first light sources 321, which corresponds to the other end portion of the both end portions S, and the incident surface 311.

The distances d3 and d3-1 between the both end portions S of the incident surface 311 and the second light sources 323 corresponding to the both end portions S is larger than a distance d4 between the center portion C of the incident surface 311 and the second light sources 323 corresponding to the center portion C of the incident surface 311. In addition, the distance d3-1 between a second light source of the second light sources 323, which corresponds to one end portion of the both end portions S, and the incident surface 311 may be smaller than the distance d3 between a second light source of the second light sources 323, which corresponds to the other end portion of the both end portions S, and the incident surface 311.

According to the display apparatus 500 of the first exemplary embodiment as described above, the distance between the end portions S of the incident surface 311 and the first and second light sources 321 and 323 facing the end portion S is larger than the distance between the center portion C of the incident surface 311 and the first and second light sources 321 and 323 facing the center portion C of the incident surface 311. Accordingly, the area of the incident surface 311, which is covered by the lights emitted from the first and second light sources 321 and 323 corresponding to the end portions S, is comparatively wider. As a result, a discontinuous color pattern may be prevented from occurring on an active area 310A of the light guide plate 310, which corresponds to the display area 140 of the display panel 100.

Figure 3:
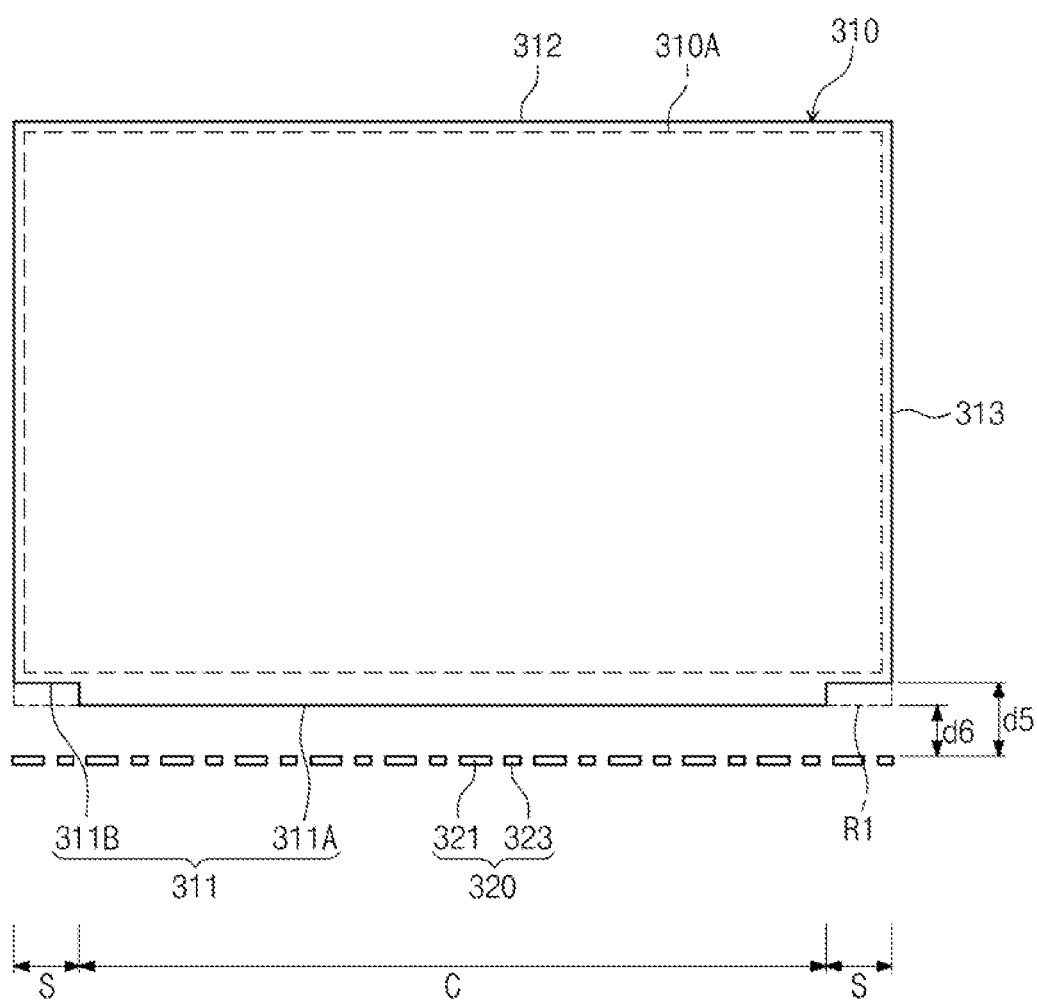
FIG. 3 is a plan view showing a light guide plate and a light source part according to a second exemplary embodiment of the present invention.
Figure 4:
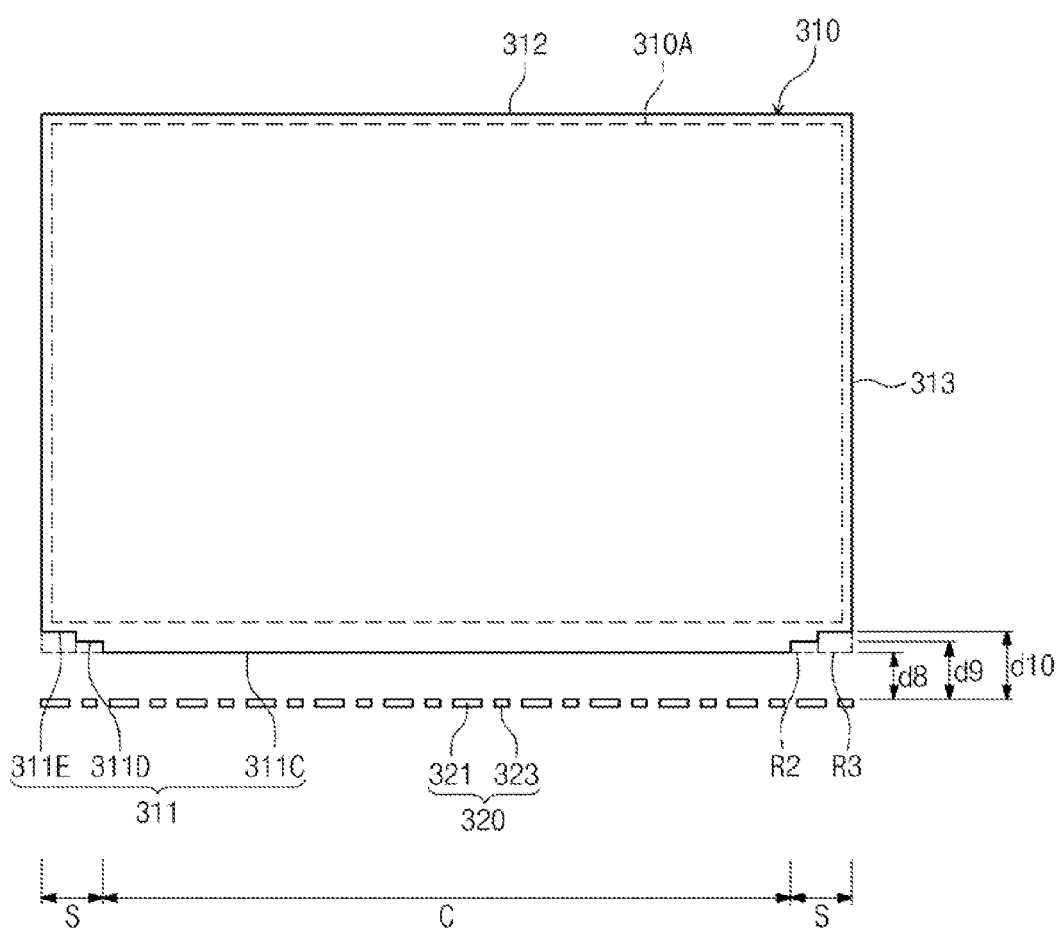
FIG. 4 is a plan view showing a light guide plate and a light source part according to a third exemplary embodiment of the present invention.

FIG. 3 is a plan view showing a light guide plate and a light source part according to a second exemplary embodiment of the present invention and FIG. 4 is a plan view showing a light guide plate and a light source part according to a third exemplary embodiment of the present invention. In FIGS. 3 and 4, the same reference numerals denote the same elements in FIGS. 1 and 2, and thus detailed descriptions of the same elements will be omitted.

Referring to FIGS. 3 and 4, the light source part 320 is disposed corresponding to the incident surface 311 of the light guide plate 310. The light source part 320 includes the first light sources 321 and the second light sources 323 alternately arranged with the first light sources 321 and emitting light having the different color from that of the light emitted from the first light sources 321. The first and the second light sources 321 and 323 are arranged in one straight line.

The light guide plate 310 includes at least one recess area disposed at the both end portions S, so that the incident surface 311 may include plural light incident surfaces 311A, 311B, 311C, 311D, and 311E.

In detail, as shown in FIG. 3, the light guide plate 310 may include first recess areas R1 respectively disposed at the both end portions S of the incident surface 311. Thus, the incident surface 311 includes a first light incident surface 311A corresponding to the center portion C of the incident surface 311 and facing the light source part 320 and second light incident surfaces 311B respectively corresponding to the first recess areas R1 and facing the light source part 320. Accordingly, a distance d6 between the first light incident surface 311A and the light source part 320 is smaller than a distance d5 between the light source part 320 and the second light incident surfaces 311B.

In addition, as shown in FIG. 4, the light guide plate 310 may include second recess areas R2 respectively disposed at the both end portions S of the incident surface 311 and third recess areas R3 respectively disposed at the both end portions S of the incident surface 311. The second recess areas R2 are disposed closer to a center of the center portion C of the incident surface 311 than the third recess areas R3. In addition, the incident surface 311 includes a third light incident surface 311C facing the light source part 320 in the center portion C, fourth light incident surfaces 311D facing the light source part 320 in the second recess areas R2, and fifth light incident surfaces 311E facing the light source part 320 in the third recess areas R3

When assuming that distances between the light source part 320 and each of the third, fourth, and fifth light incident surfaces 311C, 311D, and 311E are referred to as d8, d9, and d10, respectively, the distance d8 is the smallest and the distance d10 is the largest. That is, the distance d8 between the third light incident surface 311C and the light source part 320 is smaller than the distance d9 between the fourth light incident surface 311D and the light source part 320. In addition, the distance d9 between the fourth light incident surface 311D and the light source part 320 is smaller than the distance d10 between the fifth light incident surface 311E and the light source part 320.

According to the display apparatus 500 of the second and third exemplary embodiments, the light guide plate 310 includes the recess areas respectively disposed at the end portions S of the incident surface 311. Thus, the distance between the light source part 320 and the end portions S is enhanced by the recess areas. Accordingly, the area of the incident surface 311, which is covered by the lights emitted from the first and second light sources 321 and 323 corresponding to the end portions S of the incident surface 311, may be comparatively wider. As a result, the discontinuous color pattern may be prevented from occurring on the active area 310A of the light guide plate 310, which corresponds to the display area 140 of the display panel 100.

Figure 5:
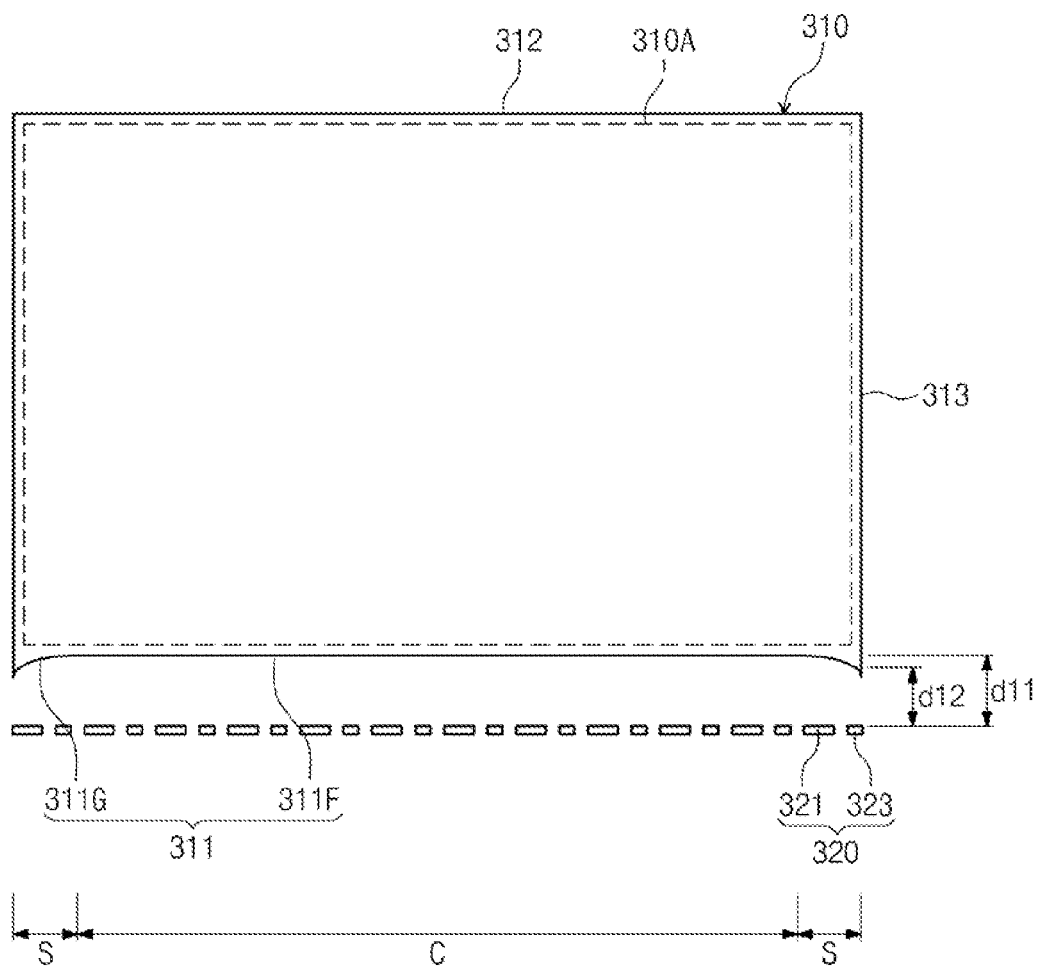
FIG. 5 is a plan view showing a light guide plate and a light source part according to a fourth exemplary embodiment of the present invention.

FIG. 5 is a plan view showing a light guide plate and a light source part according to a fourth exemplary embodiment of the present invention. In FIG. 5, the same reference numerals denote the same elements in FIGS. 1 and 2, and thus detailed descriptions of the same elements will be omitted.

Referring to FIG. 5, the light source part 320 includes the first light sources 321 and the second light sources 323 alternately arranged with the first light sources 321 and emitting light having the different color from that of the light emitted from the first light sources 321. The first and second light sources 321 and 323 are arranged in one straight line.

The incident surface 311 of the light guide plate 310 includes a sixth light incident surface 311F corresponding to the center portion C of the incident surface 311 and seventh light incident surfaces 311G respectively positioned at the both end portions S of the incident surface 311. The sixth light incident surface 311F is substantially parallel with the direction in which the first and second light sources 321 and 323 are arranged, and the seventh light incident surfaces 311G may be gradually bent to the light source part 320 from both ends of the sixth light incident surface 311F. Thus, a distance d11 between the sixth light incident surface 311F and the light source part 320 is larger than a distance d12 between the light source part 320 and each of the seventh light incident surfaces 311G.

According to the display apparatus 500 of the fourth exemplary embodiment, the distance between the light source part 320 and the active area 310A corresponding to the display area 140 is enhanced. Accordingly, the active area 310A of the light guide plate 310, which is covered by the lights emitted from the first and second light sources 321 and 323, may be comparatively wider. Therefore, the discontinuous color pattern may be prevented from occurring on the display area 140 of the display panel.

Figure 6:
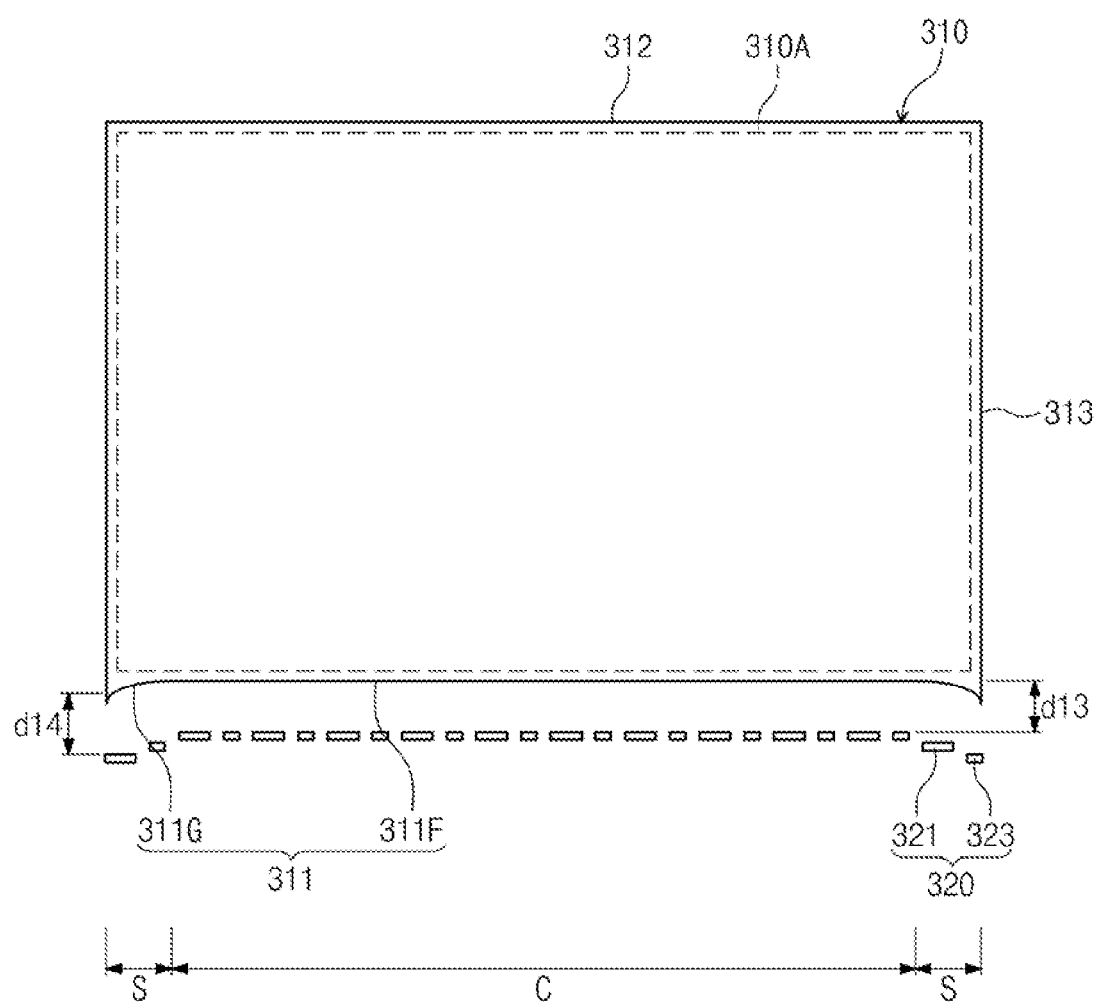
FIG. 6 is a plan view showing a light guide plate and a light source part according to a fifth exemplary embodiment of the present invention.

FIG. 6 is a plan view showing a light guide plate and a light source part according to a fifth exemplary embodiment of the present invention. In FIG. 6, the same reference numerals denote the same elements in FIGS. 1 and 2, and thus detailed descriptions of the same elements will be omitted.

Referring to FIG. 6, the incident surface 311 of the light guide plate 310 includes a sixth light incident surface 311F corresponding to the center portion C of the incident surface 311 and seventh light incident surfaces 311G respectively positioned at the both end portions S of the incident surface 311. The seventh light incident surfaces 311G are inclined at points at which the sixth light incident surface 311F is connected to the seventh light incident surfaces 311G with respect to the sixth light incident surface 311F.

In detail, the seventh light incident surfaces 311G may be connected to both ends of the sixth light incident surface 311F, respectively, and may be curved toward the light source part 320. In addition, the seventh light incident surfaces 311G may be connected to both ends of the sixth light incident surface 311F, respectively, and may be inclined toward the light source part 320.

The light source part 320 includes the first light sources 321 and the second light sources 323 alternately arranged with the first light sources 321 and emitting light having the different color from that of the light emitted from the first light sources 321. The first and second light sources 321 and 323 are arranged to be spaced apart from the sixth light incident surface 311F and the seventh light incident surfaces 311G at regular intervals. That is, the distance d13 between the sixth light incident surface 311F and the first and second light sources 321 and 323 disposed corresponding to the center portion C of the light incident surface 311 is the same as the distance d14 between the seventh light incident surfaces 311G and the first and second light sources 321 and 323 disposed corresponding to the end portions S of the incident surface 311.

According to the display apparatus 500 of the fifth exemplary embodiment, the distance between the light source part 320 and the active area 310A corresponding to the display area 140 is enhanced. Accordingly, the light emitted from the first and second light sources 321 and 323 may be mixed with each other in the active area 310A of the light guide plate 310. Therefore, the discontinuous color pattern may be prevented from occurring on the display area 140 of the display panel.

Figure 7:
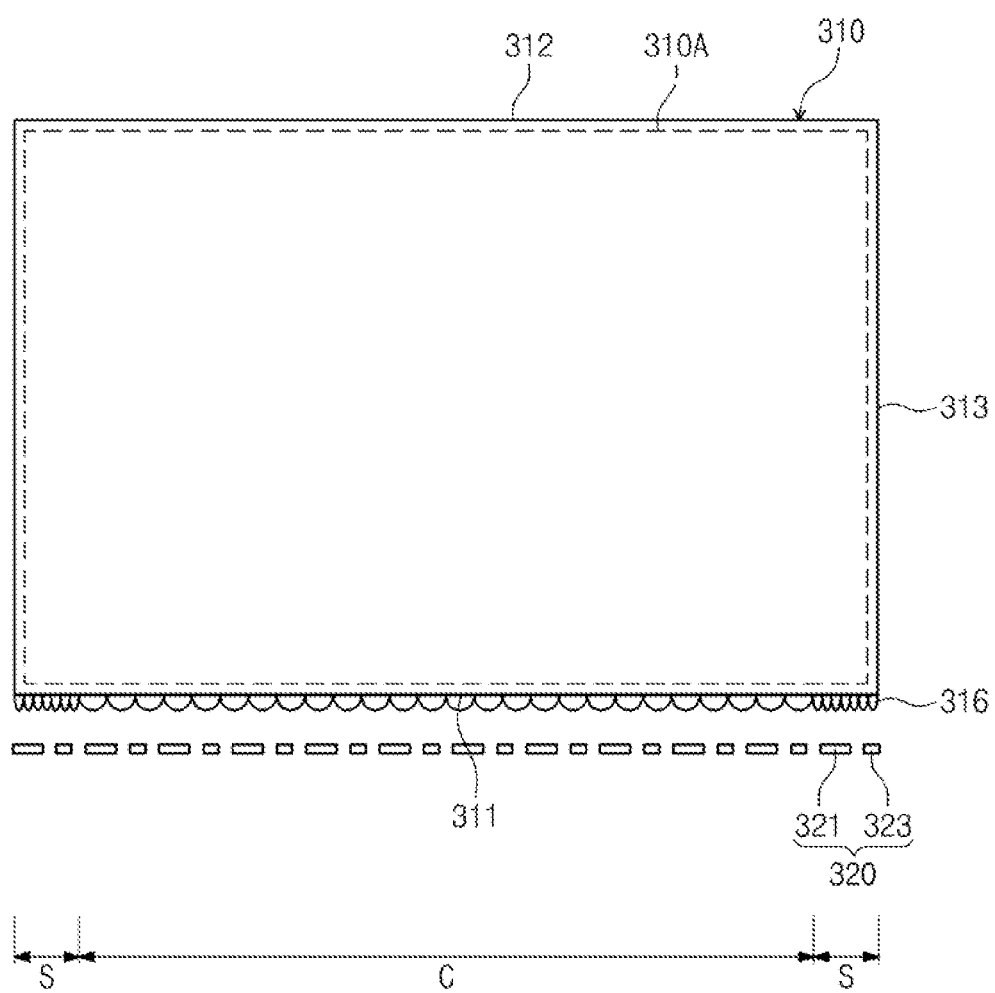
FIG. 7 is a plan view showing a light guide plate and a light source part according to a sixth exemplary embodiment of the present invention.
Figure 8:
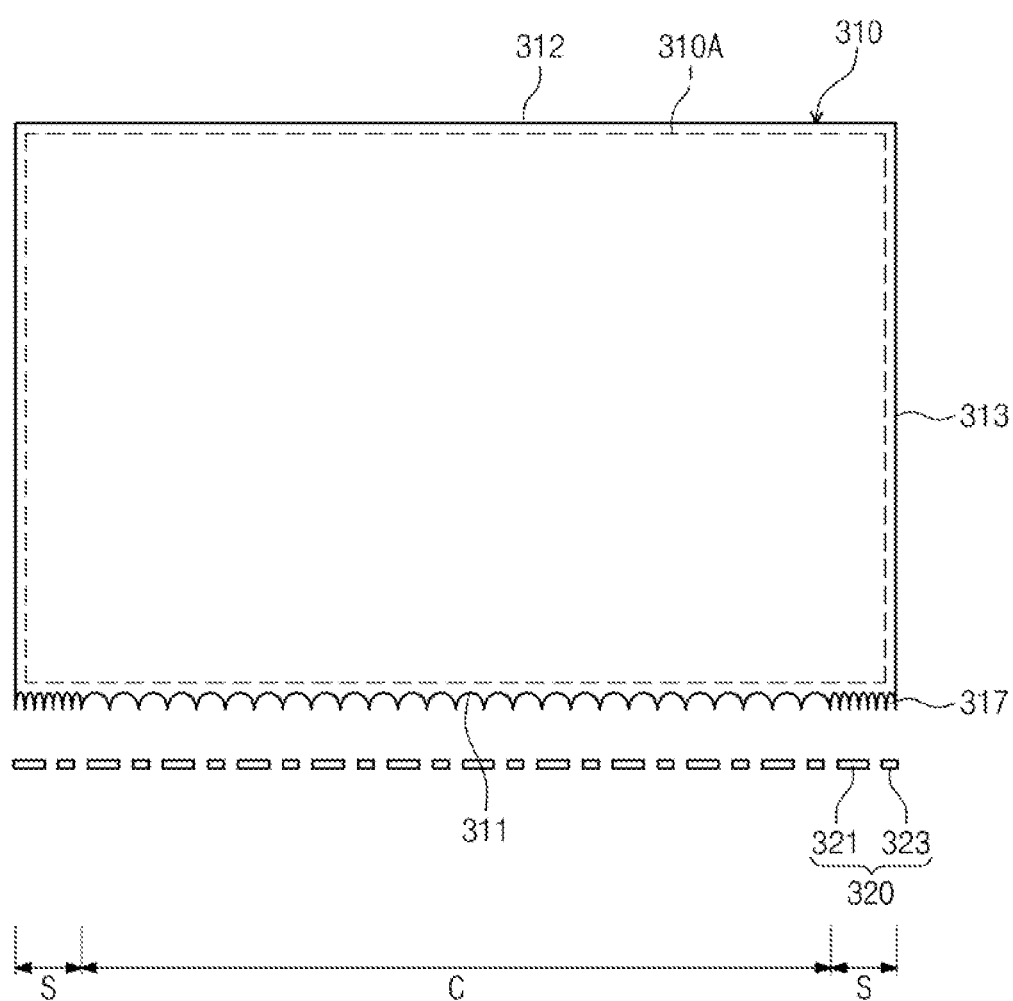
FIG. 8 is a plan view showing a light guide plate and a light source part according to a seventh exemplary embodiment of the present invention.
Figure 9:
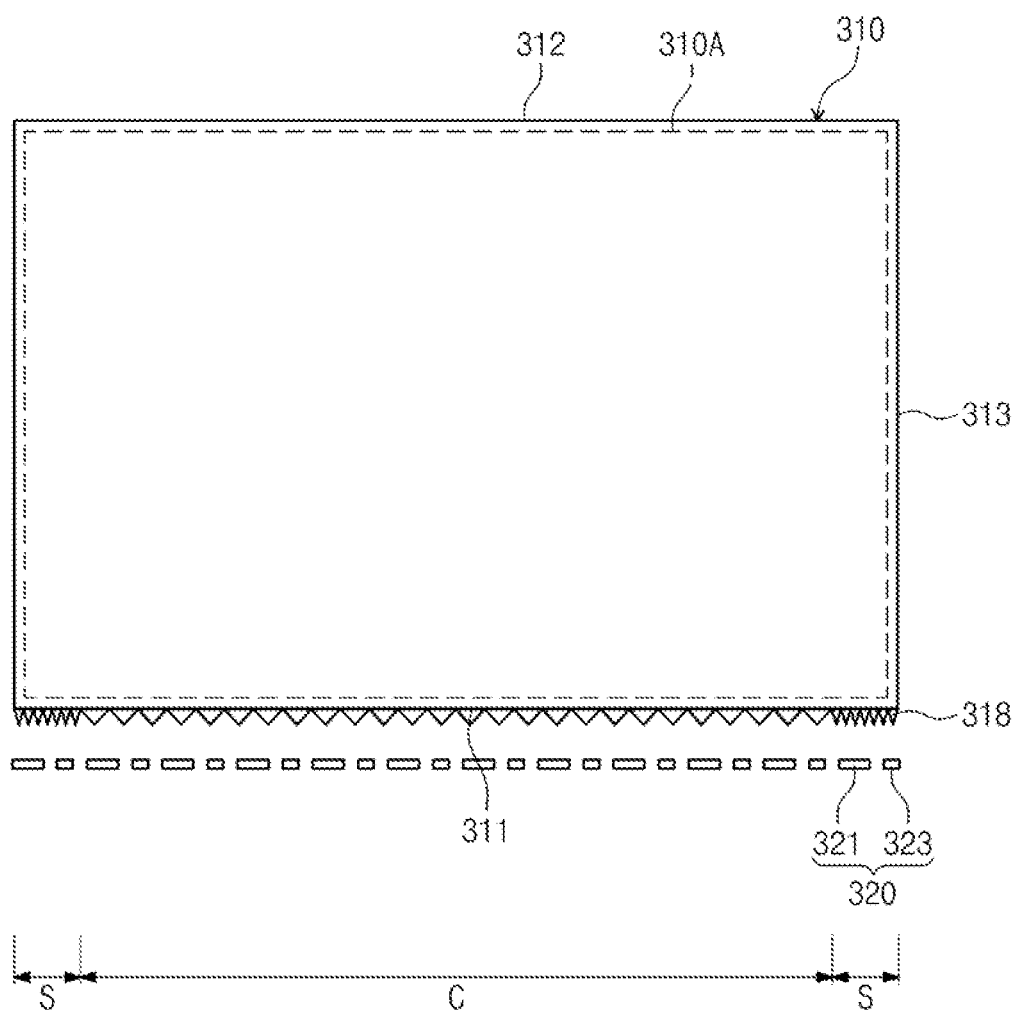
FIG. 9 is a plan view showing a light guide plate and a light source part according to an eighth exemplary embodiment of the present invention.

FIG. 7 is a plan view showing a light guide plate and a light source part according to a sixth exemplary embodiment of the present invention, FIG. 8 is a plan view showing a light guide plate and a light source part according to a seventh exemplary embodiment of the present invention, and FIG. 9 is a plan view showing a light guide plate and a light source part according to a eighth exemplary embodiment of the present invention.

Referring to FIGS. 7 to 9, the light source part 320 includes the first light sources 321 and the second light sources 323 alternately arranged with the first light sources 321 and emitting light having the different color from that of the light emitted from the first light sources 321. The first and second light sources 321 and 323 are arranged in one straight line.

The light guide plate 310 includes various a light diffusion pattern disposed on the incident surface 311 to diffuse the light emitted from the light source part 320.

In detail, the light diffusion pattern may be a first light diffusion pattern 316 having a convex lens shape, a second light diffusion pattern 317 having a concave lens shape, and a third light diffusion pattern 318 having a triangular saw-tooth shape.

In addition, a pitch between each of the first, second, and third light diffusion patterns 316, 317, and 318, which are disposed to correspond to each end portion S of the incident surface 311, is smaller than a pitch between each of the first, second, and third light diffusion patterns 316, 317, and 318, which are disposed to correspond to the center portion C of the incident surface 311. Accordingly, the incident surface 311 has a distribution density gradient of the first, second, and third light diffusion patterns 316, 317, and 318 from the center portion C thereof to both ends S thereof.

In addition, each of the first and second light diffusion patterns 316 and 317 disposed and corresponding to the end portions S of the incident surface 311 has a curvature radius smaller than that of the first and second light diffusion patterns 316 and 317 disposed and corresponding to the center portion C of the incident surface 311. This is because the light may be widely diffused as the curvature radius becomes small.

According to the display apparatus 500 of the sixth, seventh, and eighth exemplary embodiments, the light emitted from the light source part 320 is diffused by the first, second, or third light diffusion pattern 316, 317, or 318 and incident into the light guide plate 310. Accordingly, the lights emitted from the first and second light sources 321 and 323 may be mixed with each other in the active area 310A of the light guide plate 310. Therefore, the discontinuous color pattern may be prevented from occurring on the display area 140 of the display panel.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a light source part including a plurality of first light sources and a plurality of second light sources, the first light sources configured to emit a light having a color different from a color of a light emitted from the second light sources, ones of the second light sources arranged in alternating manner with ones of the first light sources;
   a display panel configured to display an image; and
   a light guide plate including a light exiting surface facing the display panel and side surfaces extending from the light exiting surface to form sides of the light guide plate, one side surface being a light incident surface facing the light source part to guide the light;
   wherein a distance between end portions of the light incident surface and the first and second light sources disposed along the end portions is larger than a distance between a center portion of the light incident surface extending between the end portions and the first and second light sources disposed along the center portion, and the first and second light sources disposed along the center portion have a same distance from the light incident surface.

2. The display apparatus of claim 1, wherein a distance between the end portions and the first light sources disposed corresponding to the end portions is larger than a distance between the center portion and the first light sources disposed corresponding to the center portion, and a distance between the end portions and the second light sources disposed corresponding to the end portions is larger than a distance between the center portion and the second light sources disposed corresponding to the center portion.

3. The display apparatus of claim 2, wherein the light guide plate has a rectangular plate shape and the light incident surface has a single face.

4. The display apparatus of claim 3, wherein:
   a distance between one first light source proximate to one end portion and the incident surface is greater than a distance between one first light source proximate to the other end portion and the incident surface; and
   a distance between one second light source proximate to one end portion and the incident surface is less than a distance between one second light source proximate to the other end portion and the incident surface.

5. The display apparatus of claim 2, wherein the first light sources and the second light sources are arranged along an at least approximately straight line, the light guide plate comprises first recess areas respectively disposed at the end portions of the incident surface, and the incident surface comprises:
   a first light incident surface corresponding to the center portion; and
   second light incident surfaces facing the light source part in the first recess areas, and a distance between the first light incident surface and the light source part is less than a distance between the light source part and the second light incident surfaces.

6. The display apparatus of claim 2, wherein the first light sources and the second light sources are arranged along an at least approximately straight line, the light guide plate comprises first recess areas respectively disposed at both ends of the center portion and second recess areas respectively disposed at the both ends of the center portion while interposing corresponding ones of the first recess areas therebetween, and the incident surface comprises:
   a first light incident surface corresponding to the center portion;
   second light incident surfaces facing the light source part in the first recess areas; and
   third light incident surfaces facing the light source part in the second recess areas, wherein a distance between the light source part and the second light incident surfaces is larger than a distance between the light source part and the first light incident surface, and a distance between the light source part and the third light incident surfaces is larger than a distance between the light source part and the second light incident surfaces.

7. The display apparatus of claim 1, wherein the first light sources and the second light sources are arranged along an at least approximately straight line and the incident surface comprises:
   a first light incident surface corresponding to the center portion and substantially parallel to the light source part; and
   second light incident surfaces respectively corresponding to the end portions of the incident surface and respectively oriented at an angle with respect to the first light incident surface, so that ends of the second light incident surfaces farther from the first light incident surface are closer to the light source part than ends of the second light incident surfaces nearer to the first light incident surface.

8. The display apparatus of claim 1, wherein the first light sources are configured to emit the light having a magenta color and the second light sources are configured to emit the light having a green color, so as to produce a white light.

9. A display apparatus comprising:
- a light source part including a plurality of first light sources and a plurality of second light sources, the first light sources configured to emit a light having a color different from a color of a light emitted from the second light sources, and ones of the second light sources; arranged in alternating manner with ones of the first light sources;
- a display panel configured to display an image; and
- a light guide plate including a light exiting surface facing the display panel and side surfaces extending from the light exiting surface to form sides of the light guide plate, the side surfaces including a first light incident surface disposed along a center portion thereof and second light incident surfaces disposed at end portions of the first light incident surface;
- wherein the first light incident surface is a substantially planar surface extending from a point proximate to one end portion to a point proximate to the other end portion, and
- wherein at least some portions of the second light incident surfaces are inclined with respect to the first light incident surface.

10. The display apparatus of claim 9, wherein the second light incident surfaces are inclined with respect to the light source part.

11. The display apparatus of claim 9, wherein the second light incident surfaces are curved.

12. The display apparatus of claim 9, wherein the first light sources are configured to emit the light having a magenta color and the second light sources are configured to emit the light having a green color, so as to produce a white light.

13. A display apparatus comprising:
- a light source part including a plurality of first light sources and a plurality of second light sources, the first light sources configured to emit a light having a color different from a color of a light emitted from the second light sources, and ones of the second light sources arranged in alternating manner with ones of the first light sources;
- a display panel configured to display an image; and
- a light guide plate including a light exiting surface facing the display panel and side surfaces extending from the light exiting surface to form sides of the light guide plate, one side surface being a light incident surface into which the light is to be incident, the light incident surface including a plurality of light diffusion patterns;
- wherein the light diffusion patterns extend in continuous manner across substantially the entire light incident surface, and a distribution density of the light diffusion pattern in both end portions of the incident surface is higher than a distribution density of the light diffusion pattern in a center portion of the incident surface, which is positioned between the end portions.

14. The display apparatus of claim 13, wherein each of the light diffusion patterns is a concave lens pattern, and a curvature radius of the light diffusion pattern proximate to the end portions is smaller than a curvature radius of the light diffusion pattern proximate to the center portion.

15. The display apparatus of claim 13, wherein each of the light diffusion patterns is a convex lens pattern, and a curvature radius of the light diffusion pattern proximate to the end portions is smaller than a curvature radius of the light diffusion pattern proximate to the center portion.

16. The display apparatus of claim 13, wherein each of the light diffusion patterns has a triangular saw-tooth shape, and a pitch between the light diffusion patterns proximate to the end portions of the incident surface is smaller than a pitch between the light diffusion patterns proximate to the center portion of the incident surface.

17. The display apparatus of claim 13, wherein the first light sources are configured to emit the light having a magenta color and the second light sources are configured to emit the light having a green color, so as to produce a white light.

* * * * *